Figure 1:
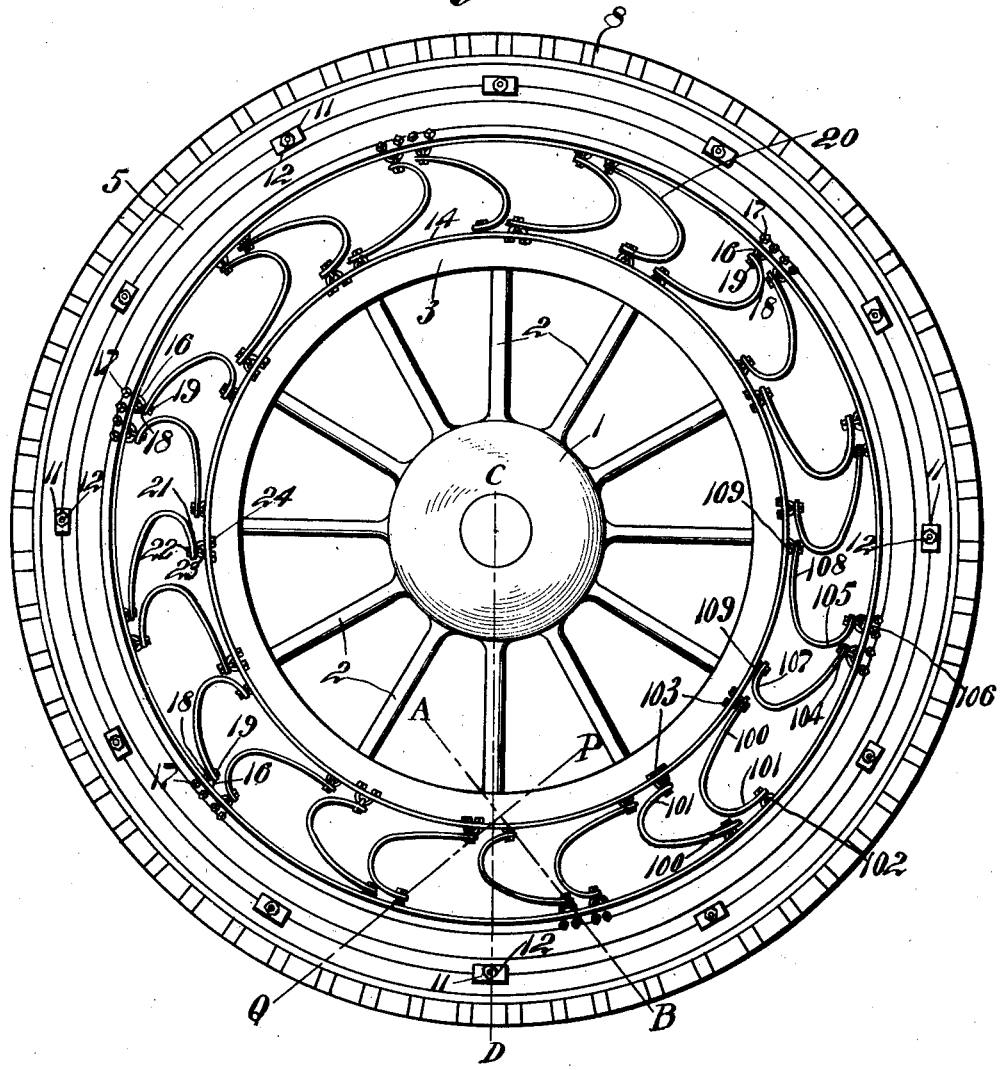

C. P. BURGESS.
VEHICLE WHEEL.
APPLICATION FILED JAN. 9, 1912.

1,057,115.

Patented Mar. 25, 1913.

2 SHEETS—SHEET 1.

Witnesses

Charles P. Burgess,
Inventor
by
Attorneys

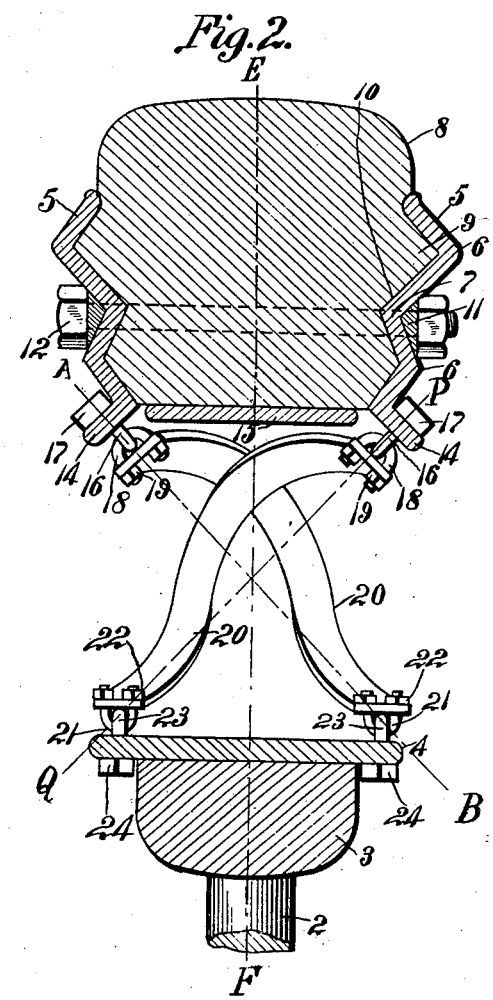

UNITED STATES PATENT OFFICE.

CHARLES P. BURGESS, OF DEPAUW, INDIANA.

VEHICLE-WHEEL.

1,057,115.   Specification of Letters Patent.   Patented Mar. 25, 1913.

Application filed January 9, 1912. Serial No. 670,295.

*To all whom it may concern:*

Be it known that I, CHARLES P. BURGESS, a citizen of the United States, residing at Depauw, in the county of Harrison and State of Indiana, have invented a new and useful Vehicle-Wheel, of which the following is a specification.

The object of the present invention is to provide a wheel in which spaced inner and outer rims are connected by a novel arrangement of resilient elements, thereby to avoid the necessity of employing pneumatic tires.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in side elevation; Fig. 2 is a radial section, showing the device which is depicted in Fig. 1.

In carrying out the invention there is provided a hub 1, from which radiate spokes 2, supporting a felly 3, circumscribed by a felly and band 4, the felly 3 and the felly band 4 constituting the inner rim of the structure.

The outer rim comprises a pair of side plates 5, equipped with channels 6, between which are located inwardly projecting ribs 7. The tire, denoted generally by the numeral 8, is disposed between the side plates 5, the tire 8 having ribs 9, adapted to register in the channels 6, there being between the ribs 9, a channel 10, adapted to receive the rib 7 of the side plate 5, the rib 9 fitting into the channels 6 of the side plates 5.

Into the depressions formed by the fashioning of the ribs 7, and upon the outer faces of the side plates 5, supporting blocks 11 are fitted, the outer faces of the supporting blocks 11 being parallel, so as to receive properly, the ends of bolt and nut structures 12, passing through the side plates 5, and engaging the tire 8. The inner edges of the side plates 5 are flexed laterally, to form flanges 14. A band 15 is provided, the same circumscribing the wheel, and bearing against the under face of the tire 8, the band 15 being located between the side plates 5 and being spaced from the side plates.

Considered generally, the tire 8 is wider adjacent its tread than it is adjacent its inner face. Consequently, when the side plates 5 are applied to the tire 8, the tire, when the wheel is in use, tends to wedge between the side plates 5. Owing to the provision of the channels 6 in the side plates 5, the space between the side plates, adjacent the periphery of the wheel, is increased, and the side plates are increased in strength accordingly.

The inner rim and the outer rim are resiliently spaced apart by a series of springs, denoted generally by the reference character 20. Referring to Fig. 1, for a general discussion of the arrangement of the springs 20, it will be observed that the springs are disposed in pairs, and that each spring 20 consists of a long arm 100 and a short arm 101. Presupposing that the operator is facing the wheel, as shown in Fig. 1, the long arm 100 of one spring of one pair, and the short arm 101 of the other spring of the same pair, are, as shown at 102, secured to outer rim, upon the far side of said rim. The short arm 101 of the first specified spring, and the long arm 100 of the second specified spring, are secured to the inner rim, upon the near side of the rim, as indicated at 103. Considering the next adjoining pair of springs, the long arm 104 of one spring, and the short arm 105 of the other spring of the pair are secured to the outer rim, upon the near side of the rim, as shown at 106. The short arm 107 of the first mentioned spring, and the long arm 108 of the second mentioned spring, are secured to the inner rim, upon the far side of said rim, as shown at 109. This alternate arrangement is carried out throughout the entire periphery of the wheel.

Noting Fig. 1 it will be observed that one spring 20 of each pair has its ends connected with the inner and outer rims upon a line A—B which, circumferentially of the wheel, intersects the radius C—D of the wheel. The other spring 20 of each pair has its ends connected with the inner and outer rims upon a line P—Q which, circumferentially of the wheel, intersects the radius C—D. Moreover, the lines A—B and P—Q incline in opposite directions, circumferentially of the wheel. Referring to Fig.

2 it will be noted that the lines A—B and P—Q also intersect the median plane E—F of the wheel, in opposite directions, transversely of the wheel.

The specific means for attaching the springs 20 to the inner rim and to the outer rim will now be dealt with in detail.

U-bolts 16 are passed through the flanges 14, the U-bolts 16 carrying at their free ends, nuts 17. The U-bolts 16 are looped into other U-bolts 18, provided with nuts 19, the U-bolts 18 passing through the ends of the arched springs 20. The inner ends of the springs 20 are equipped with U-bolts 21 carrying nuts 22. The U-bolts 21 are engaged with U-bolts 23, the U-bolts 23 being engaged with the felly band 4, and carrying nuts 24. The felly band 4 outstands beyond the edges of the felly 3, to accommodate and to receive the U-bolts 23.

The springs 20, when the wheel is supported at its axis only, are preferably in a neutral state. Therefore, those springs which are adjacent the bottom of the wheel, when the wheel is in contact with the ground, will be put under compression, those springs which are adjacent the top of the wheel being under tension; the intermediate springs, between the top and the bottom of the wheel being under tension or under compression, accordingly as they alternately follow the lines A—B and P—Q, the springs which incline downwardly from the inner rim to the outer rim being compressed and the springs which incline upwardly being elongated. Owing to the peculiar relations existing between the several springs and the radii of the wheel upon the one hand, and the median plane of the wheel upon the other hand, an even tension upon nearly all of the springs is secured, whether the wheel is driving the vehicle, is retarded by the action of a brake, or is at rest, and merely supporting the weight of the vehicle. The positioning of the springs as above described, serves to provide the required resistance and resiliency, transversely of the wheel. The springs serve to take up some of the undue stress imposed upon the wheel when a corner is rounded, the springs further serving to reduce the transverse motion of the vehicle, while the same is passing over an uneven road-bed. The springs obviously offer the necessary resistance and resiliency in a vertical direction, and the wheel, therefore, is sustained both vertically and horizontally.

The unions afforded by the interengaged U-bolts permit of adjustment, and thus wear, friction, and noise in operation, are reduced to a minimum. Moreover, the interengaged U-bolts serve to prevent a torsional movement in the springs, the springs being prevented, by the U-bolts, from turning axially.

Having thus described the invention, what is claimed is:—

In a wheel, an inner rim; an outer rim; springs connecting the rims; the springs being terminally connected to the rims in lines, which, circumferentially of the wheel, intersect the radius of the wheel, and which, transversely of the wheel, intersect the median plane of the wheel, said lines being oppositely inclined circumferentially of the wheel and transversely of the wheel; said springs being in the form of arched plates having arms of unequal lengths, the shorter arms of alternate springs being connected to the outer rim, and the longer arms of other alternate springs being connected to the inner rim.

In testimony that I claim the foregoing as my own, I have hereto affixed my signature in the presence of two witnesses.

CHAS. P. BURGESS.

Witnesses:
 WM. MURR,
 DRISCOLL FUNK.